United States Patent
Karlsson et al.

(10) Patent No.: US 10,555,027 B2
(45) Date of Patent: Feb. 4, 2020

(54) METHOD AND SYSTEM FOR BANDWIDTH CONSTRAINED MEDIA STREAMING TO A MOVING VEHICLE

(71) Applicant: ICOMERA AB, Göteborg (SE)

(72) Inventors: Mats Karlsson, Göteborg (SE); Viktor Eikman, Västra Frölunda (SE)

(73) Assignee: ICOMERA AB, Gothenburg (SE)

( * ) Notice: Subject to any disclaimer, the term of this patent is extended or adjusted under 35 U.S.C. 154(b) by 0 days.

(21) Appl. No.: 15/309,228

(22) PCT Filed: May 7, 2015

(86) PCT No.: PCT/EP2015/060075
§ 371 (c)(1),
(2) Date: Nov. 7, 2016

(87) PCT Pub. No.: WO2015/169902
PCT Pub. Date: Nov. 12, 2015

(65) Prior Publication Data
US 2017/0078729 A1 Mar. 16, 2017

(30) Foreign Application Priority Data
May 8, 2014 (EP) .................................... 14167519

(51) Int. Cl.
*H04N 7/18* (2006.01)
*H04N 21/414* (2011.01)
(Continued)

(52) U.S. Cl.
CPC ...... *H04N 21/41422* (2013.01); *H04H 20/62* (2013.01); *H04H 60/27* (2013.01);
(Continued)

(58) Field of Classification Search
CPC ......... H04N 21/4345; H04N 21/64315; H04N 21/41407; H04N 21/6131; H04N 21/6181;
(Continued)

(56) References Cited

U.S. PATENT DOCUMENTS 6,067,565 A * 5/2000 Horvitz .................. H04L 29/06
709/218
6,742,082 B1 * 5/2004 Lango ............... H04L 29/06027
711/118
(Continued)

FOREIGN PATENT DOCUMENTS

| | | |
|---|---|---|
| EP | 1 175 757 B1 | 1/2005 |
| EP | 2 629 538 A1 | 8/2013 |
| WO | WO 2005/125207 A2 | 12/2005 |

OTHER PUBLICATIONS

International Search Report (PCT/ISA/210) dated Sep. 25, 2015, by the European Patent Office as the International Searching Authority for International Application No. PCT/EP2015/060075.
(Continued)

*Primary Examiner* — William J Kim
(74) *Attorney, Agent, or Firm* — Buchanan Ingersoll & Rooney P.C.

(57) ABSTRACT

A method and a system for receiving streaming media from an external provider onboard a moving vehicle via wireless communication is disclosed. The method includes: checking, upon a request from a client device to obtain a streaming media from said external provider, whether a segment of said streaming media is available in the cache or not; forwarding, when a segment of the requested streaming media is available in the cache, the segment of the streaming media object to the client device from the cache; downloading, when the segment of the requested streaming media is not available in the cache, the segment of the streaming
(Continued)

media object from the external server, and forwarding the downloaded segment to the client device, and storing the segment in the cache.

10 Claims, 3 Drawing Sheets

(51) Int. Cl.
*H04L 29/08* (2006.01)
*H04H 20/62* (2008.01)
*H04H 60/27* (2008.01)
*H04N 21/433* (2011.01)
*H04L 29/06* (2006.01)
*H04N 21/2187* (2011.01)
*H04N 21/436* (2011.01)
*H04N 21/442* (2011.01)
*H04N 21/472* (2011.01)
*H04N 21/61* (2011.01)

(52) U.S. Cl.
CPC .......... *H04L 65/4069* (2013.01); *H04L 67/12* (2013.01); *H04L 67/2814* (2013.01); *H04L 67/2842* (2013.01); *H04N 21/2187* (2013.01); *H04N 21/436* (2013.01); *H04N 21/4331* (2013.01); *H04N 21/44209* (2013.01); *H04N 21/472* (2013.01); *H04N 21/6131* (2013.01)

(58) Field of Classification Search
CPC ........... H04N 21/4334; H04N 21/2541; H04N 21/4147; H04N 21/2387; H04N 21/6377
USPC ...... 725/75, 62, 133, 34, 93, 14, 32, 77, 25, 725/105, 116, 46, 76, 143, 73
See application file for complete search history.

(56) References Cited

U.S. PATENT DOCUMENTS

2006/0230170 A1* 10/2006 Chintala ............ H04N 7/17336
709/231
2008/0240029 A1 10/2008 Lynch et al.
2010/0189089 A1* 7/2010 Lynch ................ H04B 7/18506
370/338
2013/0138795 A1* 5/2013 Field .................. H04N 21/2221
709/224
2014/0143439 A1* 5/2014 Ramamurthy ... H04N 21/23439
709/231

OTHER PUBLICATIONS

Written Opinion (PCT/ISA/237) dated Sep. 25, 2015, by the European Patent Office as the International Searching Authority for International Application No. PCT/EP2015/060075.

* cited by examiner

METHOD AND SYSTEM FOR BANDWIDTH CONSTRAINED MEDIA STREAMING TO A MOVING VEHICLE

TECHNICAL FIELD OF THE INVENTION

The present invention relates to a method and system for receiving streaming media from an external provider onboard a moving vehicle via wireless communication.

BACKGROUND

There is today an increasing demand from passengers to be able to communicate through mobile phones and other handheld terminals when travelling on trains, and also to be able to get access to the Internet with laptops, PDAs etc. However, train carriages are made of metal, and even the windows are normally covered with a metal film. Accordingly, train carriages are shielded compartments, and direct communication between terminal antennas within the carriages and externally located antennas is difficult to obtain. Further, with the new smartphones, and the way these are used, with e.g. continuously operating applications, many phones are active at all times, meaning that many handovers are required when the train moves. Even though this problem is common for all moving vehicles, it is especially pronounced for vehicles moving at high speed, such as trains.

To this end, train carriages are often provided with an external antenna connected to a repeater unit within the carriage, which in turn is connected to an internal antenna. Hence, the communication between the passengers' terminals and the operator antennas outside the trains occurs through the repeater unit. Similarly, it is known to provide a mobile access router for data communication, also connected both to an external antenna and an internal antenna, in each carriage, in order to provide Internet access on-board the train. Such mobile access router solutions are e.g. commercially available from the applicant of the present application, Icomera AB, of Gothenburg, Sweden, and are also disclosed in EP 1 175 757 by the same applicant. However, the aforementioned solution is often insufficient to obtain an optimal transmission performance, especially for large data volumes. Trains and other moving vehicles often pass through areas with bad radio coverage, and present solutions are often unable to handle the required traffic.

At the same time, broadcast television and radio networks are currently being replaced with digital media services based on the Internet, where video and audio is downloaded to consumers using the Internet Protocol (IP), as they are being consumed. These "streaming" media services offer a vastly wider range of content than traditional television and radio, both live and on demand.

Streaming video of high quality requires consistently high throughput of data. Consistency is needed in part because content providers do not wish to expend bandwidth on data that is not eventually viewed, and therefore offer on-demand video at the rate it is being watched, with a short buffer to handle temporary problems. Live streaming cannot, by definition, be protected by a long buffer, and is correspondingly more sensitive.

To this end, solutions such as adaptive bitrate have been developed. As an example, HTTP Live Streaming (HLS) is a media streaming communications protocol that works by breaking the overall stream into a sequence of small files/segments, commonly called "chunks", each downloaded via HTTP and containing a brief section of the content. An extended M3U playlist allows the client to select interchangeable chunks from a number of different sub-streams. These contain the same media material, such as a feature film, but encoded at a variety of bitrates, typically with different resolution, audio compression severity etc. By this method, the viewer can compromise between quality and possible "stutter" in delivery. If the viewer does not choose a sub-stream manually, software algorithms will normally choose one that appears to match the performance of the viewer's Internet connection. Some competing protocols, such as Dynamic Adaptive Streaming over HTTP (DASH, now an international standard) use the same mechanism.

Generally more efficient encoding of video and audio have also improved the quality of streaming media over the past 20 years, relative to data throughput. Another form of improvement is the wide distribution of content mirrors, i.e. servers replicating media content, so that each client gets a relatively short path to the nearest source of a given stream.

Viewer expectations rise at a rate similar to that of improvements in quality resulting from these innovations. Expectations remain difficult to meet in bandwidth-constrained situations, such as mobile devices on wireless network links. Wireless links remain inferior in throughput to wired links in concurrent development. The available throughput, and the reliability of that throughput, are especially poor on moving vehicles.

In motion, Rayleigh fading and interference frequently defeat the mechanisms in place to alleviate the smaller range of problems that exist in media streaming to wired devices. This is especially true if multiple, rapidly moving users each have a personal wireless link, such as a 4G (e.g. LTE) modem or personal mobile telephone. This is because the resources available from wireless infrastructure are commonly overtaxed by a large amount of users with high bandwidth requirements, particularly in rural areas, where the infrastructure is generally poor. A metal fuselage or other vehicle exterior with windows tinted by metallic film forms a Faraday shield, another common cause of signal degradation in wireless transmission to personal modems inside vehicles.

The situation is similar when multiple users share a connection from a moving vehicle to the Internet, such as discussed above. This is the case on some public transportation buses and light rail as well as long-distance passenger trains, planes and ferries with hundreds of passengers with an on-board network. On such networks, external connectivity is typically provided by a satellite or wireless wide-area network (WWAN) link, or any small set of such links. In this scenario, the antennas are likely external to the vehicle and therefore outside the Faraday shield of the vehicle's body. However, the congestion that results from multiple users trying to retrieve their own copies of the same media stream can still cause most or all of these users to receive a low-quality sub-stream at an uneven pace.

With or without a shared link, the worst-case scenario is multiple users trying to access a popular live video stream. Examples of such streams would be live news reports and major sporting events, where several hundred passengers on a single vehicle may realistically want to watch the video on private devices. A live stream that cannot be delayed by the individual clients having to buffer content locally will instead become unavailable as a result of competition for bandwidth bringing average throughput near or below the threshold of even the lowest-bitrate sub-stream.

Streaming media the way it is currently done uses far more data per minute of journey per passenger than older uses of the Internet, such as browsing text- and image-based sites like Facebook, or checking and responding to email. WWAN links from a vehicle to the Internet, including 4G links, are typically associated with a significant cost. This is especially true with multiple, concurrent users of each single link, as is the case with Wi-Fi services on board a passenger train. An on-board network that uses data services provided by third parties can therefore represent a significant part of the monthly running costs of a vehicle for some operators. Therefore, even if there is sufficient bandwidth available for the streaming of media at reasonable quality to each user, the amount of data such usage incurs can prove a financial issue for the vehicle operators, who are looking to get the best return on investment for the data that they purchase.

There is therefore a need for an improved method and system for receiving streaming media from an external provider onboard a moving vehicle via wireless communication, which provides better capacity utilization, quality and/or cost-efficiency. Even though the above discussion is focused on trains, similar situations and problems are encountered in many other types of moving vehicles, and in particular moving passenger vehicles, such as buses, ships and airplanes.

SUMMARY OF THE INVENTION

It is therefore an object of the present invention to provide a wireless communication method and system for moving vehicles which alleviates all or at least some of the above-discussed drawbacks of the presently known systems. Another object of the invention is to provide a wireless train communication system, and a corresponding method, which, to a relatively low cost, provides good quality for receiving streaming media on-board a moving vehicle.

This object is achieved by means of a wireless communication system for a moving vehicle, and a corresponding method, as defined in the appended claims.

According to a first aspect of the invention, there is provided a method for receiving streaming media from an external provider onboard a moving vehicle via wireless communication, wherein at least one router is provided in the moving vehicle for receiving and transmitting wireless data communication to and from a stationary communication server outside said moving vehicle through an exterior mobile network, said at least one router being provided with or connected to a local proxy server and a cache onboard the vehicle, wherein said router is accessible by a plurality of client devices onboard said vehicle, comprising:

checking, upon a request from a client device to obtain a streaming media from said external provider, whether a segment of said streaming media is available in the cache or not;

forwarding, when a segment of said requested streaming media is available in the cache, the segment of the streaming media object to the client device from the cache;

downloading, when said segment of the requested streaming media is not available in the cache, the segment of said streaming media object from said external server, and forwarding the downloaded segment to the client device, and storing the segment in the cache.

The "router" is a networking router, which is a machine that forwards data packets between computer networks, on at least one data link in each direction. The router may be a mobile access router, and preferably a mobile access and applications router. The local proxy server and cache may be formed integrated with the router, or may be separate units connected to the router.

The external provider may be any server accessible through the exterior network, such as a gateway through which the communication from the moving vehicle is transferred, a content provider server, or the like.

The router and the external provider are preferably connected through a plurality of exterior mobile networks, which are simultaneously useable. Also, the router is preferably arranged to communicate with the communication server on at least two different data links (communication routes) having different characteristics, and to automatically separate the communication traffic between said data links based on the evaluation. The communication can be automatically optimized based on static or dynamic parameters, such as signal strength and the like. Such further optimizations are per se known from EP 1 175 757 by the same applicant, said document hereby incorporated by reference. An automatic selection is then made among the available data links to use the most efficient combination. Hence, a seamless distribution of the data among the different data links is obtained.

The router may use any available data links, such as two or more of e.g. Satellite, DVB-T, HSPA, EDGE, 1×RTT, EVDO, LTE, LTE-A, WiFi (802.11), Ethernet and WiMAX; and combine them into one virtual network connection. In particular, it is preferred to use data links provided through wireless wide-area network (WWAN) communication technologies.

The present invention is based on the realization that much data traffic to a moving vehicle, and in particular public transportation vehicles, such as trains, relates to streaming media, and in particular live video streaming, and that very frequently, multiple users are watching or listening to the same media content. In particular, this is the situation during major sport events and when other news of public interest occurs. By means of the present invention, the problem of a bandwidth bottleneck is overcome by reuse of already downloaded segments of the streaming media, and locally distributing this to the additional one or many users on-board the vehicle who also wish to download the same streaming media content. This dramatically lowers the traffic load on the communication channel(s) between the vehicle and the exterior mobile network, thereby leading both to lowered costs and increased quality.

By means of the invention, when multiple users try to access the same media stream on one or more shared external links, the router positioned between the users and the link or links selects and stores segments of that stream and distribute copies of these segments locally, to all those users who subsequently request the same resource from the Internet or an equivalent external provider.

This arrangement is very cost-efficient and easy to implement for handling cases of live streams, because the caching device would then not need to maintain the information in memory for more than a few seconds. However, given adequate memory, the caching device could store any material for the same purpose of transparent local distribution, for an extended period of time, or even indefinitely. Thus, for example, a selection of live streams and archived content from a national television website can be cached as demand is demonstrated, to give users access to multiple television channels as well as a selection of programs previously shown on these, with little need for configuration of the caching device.

"Streaming media", such as audio or video, is used to indicate that the data representing the media is provided over a network to a client terminal on an as-needed basis rather than being pre-delivered in its entirety before playback.

The downloaded streaming media objects are preferably stored in the cache for a predetermined time. Said predetermined time may be in the range 0.2-120 seconds, and preferably in the range 0.5-30 seconds, and most preferably in the range 1-10 seconds. This is particularly well suited for situations where the streaming media object is a live video data stream.

However, alternatively, predetermined time may be in the range of 1 hour to 1 week, and preferably within the range of 2-48 hours.

The downloaded streaming media objects may also be stored in the cache until a predetermined storage criterion is no longer fulfilled. The predetermined storage criterion may relate to a predetermined number of requested downloads by client devices onboard the vehicle within a predetermined time period.

The method further preferably comprises identifying the encoded bitrate of the streaming media segment, and if a version of the streaming media segment with a higher encoded bitrate is available on the external server, attempt to download the streaming media segment with a higher encoded bitrate, and, if successful, replace the original streaming media segment of lower encoded bitrate with said streaming media segment with higher encoded bitrate in the cache. Hereby, segments of poor quality can subsequently be replaced with segments of better quality.

Bitrate refers to the number of bits used per unit of playback time to represent a continuous medium such as audio or video after source coding (data compression). The encoding bitrate is the goodput that is required to avoid interruption.

The method may further comprise downloading in advance of predetermined streaming media objects to said cache prior to any request for said streaming media from any clients. This downloading in advance may occur at time periods when the use of the router by said clients is low, and/or when low-cost and/or high-bandwidth links to the exterior mobile network are available. For example, the most popular programs available on one or several television or broadcasting network websites may be downloaded regularly, such as each night. Such batch downloading may e.g. be performed when the trains are parked during night hours, etc, and where there is access to e.g. a WiFi network.

According to another aspect of the invention, there is provided a wireless communication system for a moving vehicle, comprising:

at least one router in the moving vehicle for receiving and transmitting wireless data communication to and from a stationary communication server outside said moving vehicle through an exterior mobile network, wherein said router is accessible by a plurality of client devices onboard said vehicle;

a local proxy server and a cache onboard the vehicle, being connected to or integrated with said router;

wherein the router is adapted to check, upon a request from a client device to obtain a streaming media from said external provider, whether a segment of said streaming media is available in the cache or not, and to forward the segment of said requested streaming media from the cache to the client when the segment is available in the cache, and to download the segment from the external server when the requested segment of the streaming media is not available in the cache, forward the downloaded segment to the client device, and store the segment in the cache.

With this aspect of the invention, similar advantages and preferred features are present as in the previously discussed first aspect of the invention.

The router and the communication server are preferably connected through a plurality of exterior mobile networks, which are simultaneously useable.

The router is preferably arranged to communicate with the communication server on at least two different communication routes having different characteristics, and to automatically separate the communication traffic between said communication routes based on specific optimization conditions, such as price, latency and/or speed.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the following examples, an embodiment related to a train is disclosed. However, it is to be acknowledged by the skilled reader that the method and system are correspondingly useable on other moving vehicles, such as busses and the like.

Figure 1:
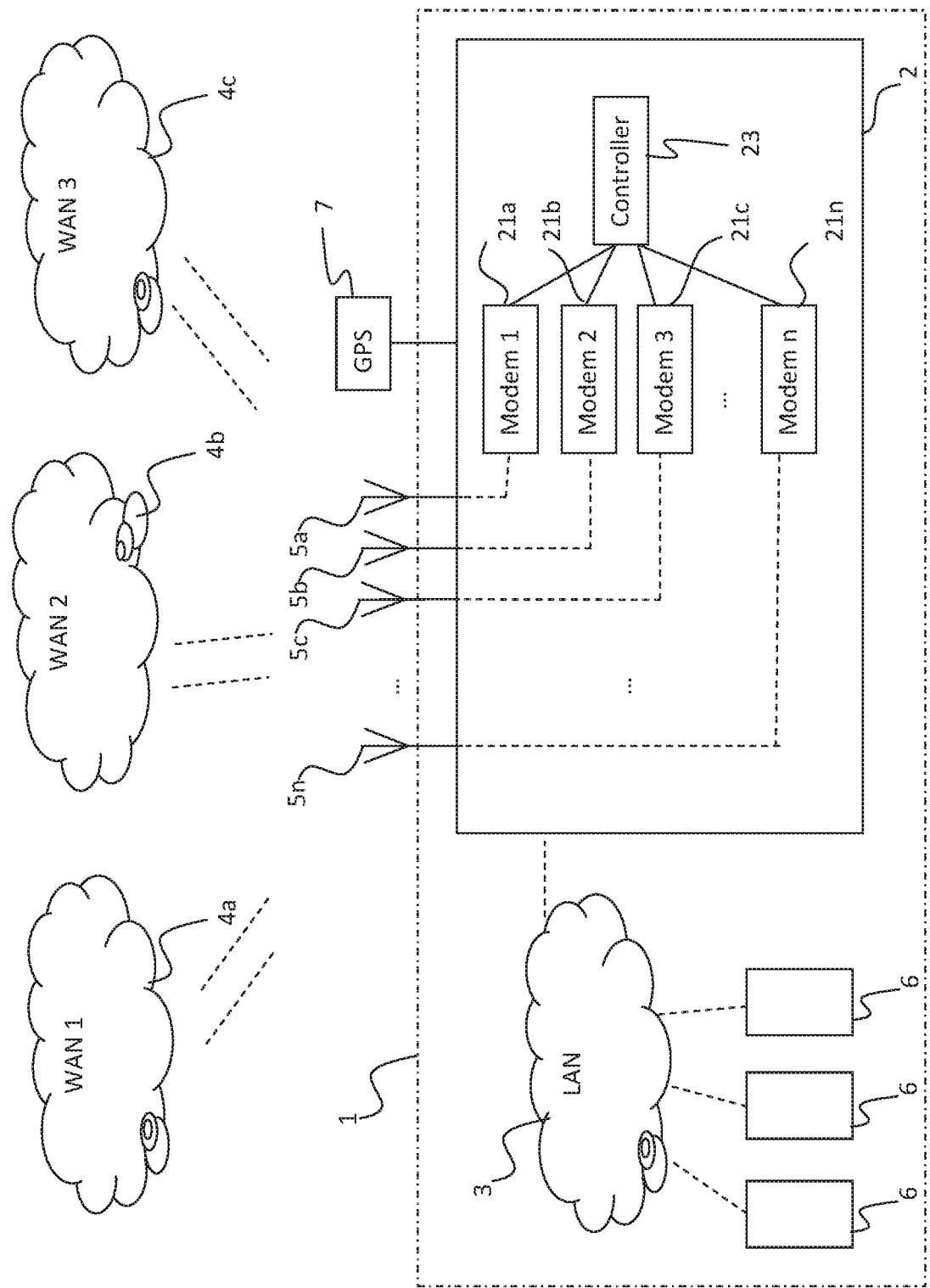
FIG. 1 is a schematic illustration of a train having a wireless communication system in accordance with an embodiment of the present invention.

In FIG. 1 a schematic illustration of a vehicle 1, such as a train, having a communication system is provided. The communication system comprises a data communication router 2 for receiving and transmitting data between an internal local area network (LAN) 3, and one or several external wide area networks (WANs) 4a, 4b, 4c. Communication to and from the WANs is provided through one or several antennas 5 *a-n* on the vehicle roof. Two or more data links are available, either between the train and one of the WANs, and/or by using several WANs simultaneously.

The LAN is preferably a wireless network, using one or several internal antennas to communicate with terminal units 6 within the vehicle. It is also possible to use a wired network within the vehicle. The LAN may be set-up as wireless access point(s). The client(s) 6 may be computing devices such as laptops, mobiles telephones, PDAs and so on.

The data communication router comprises a plurality of modems 21 *a-n*. Assignment of data streams to different WANs and/or to different data links on one WAN is controlled by a controller 23. The controller is preferably realized as a software controlled processor. However, the controller may alternatively be realized wholly or partly in hardware.

The system may also comprise a global positioning system (GPS) receiver 7 for receiving GPS signals indicative of the current position of the vehicle, and wherein the controller may be arranged to assign data streams to various data links also partly in dependence on said received GPS signals.

The data communication router may also be denominated MAR (Mobile Access Router) or MAAR (Mobile Access and Applications Router).

The data communication router is preferably arranged to communicate on at least two different communication routes having different characteristics. Hereby, the communication can be automatically optimized based on specific conditions, such as price, speed, etc. Such data communication routers are e.g. known from EP 1 175 757 by the same applicant, said document hereby incorporated by reference. Such routers are also commercially available from the applicant, Icomera AB. Hereby, the router may use all available data channels, such as two or more of e.g. Satellite, DVB-T, HSPA, EDGE, 1×RTT, EVDO, LTE, LTE-A, WiFi (802.11), Ethernet and WiMAX; and combine them into one virtual network connection. An automatic selection may be made among the available channels to use the most cost effective combination that fulfils the users' availability, bandwidth and reliability requirements. Hence, a seamless distribution of the data among said different channels can be obtained.

Figure 2:
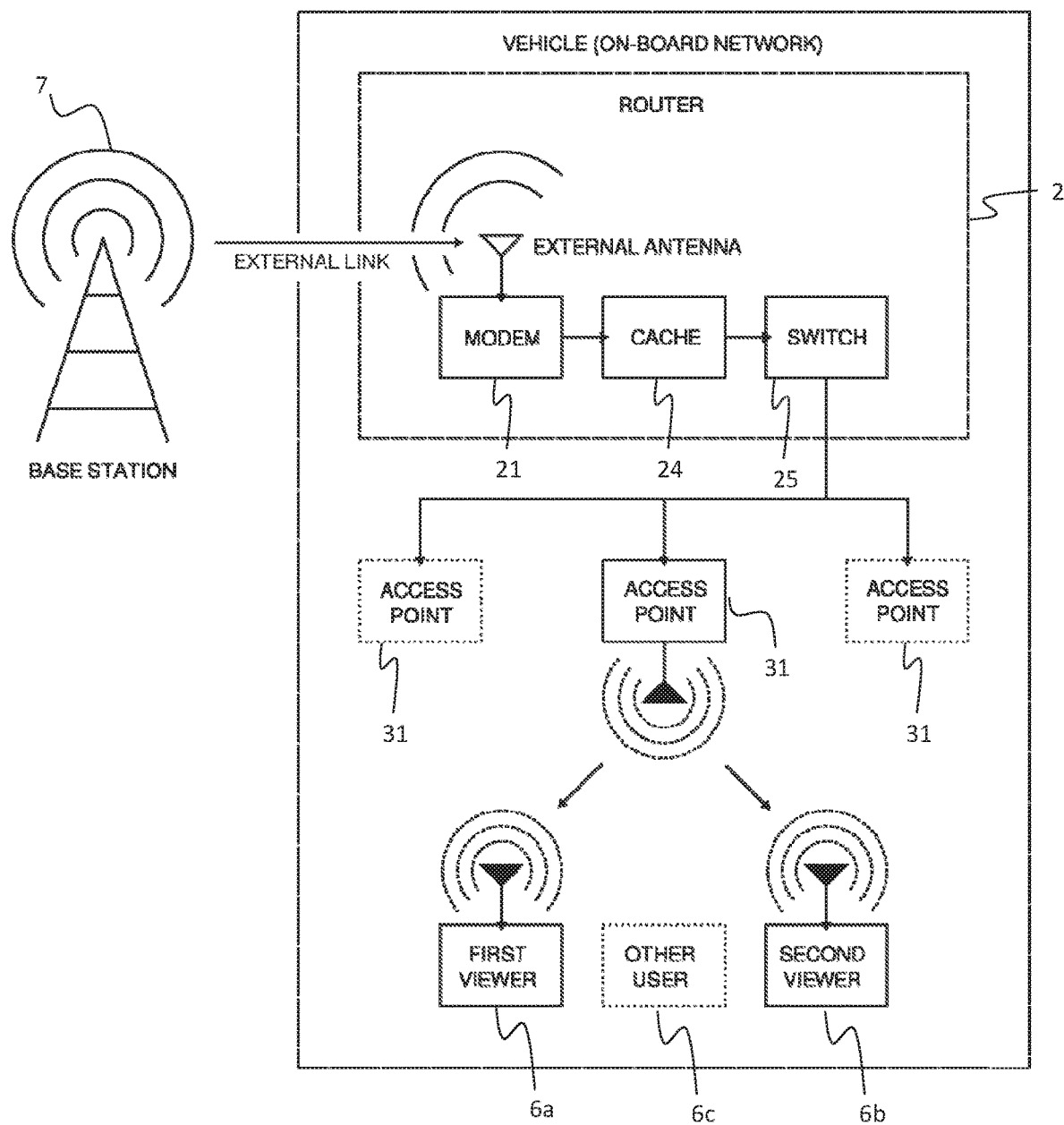
FIG. 2 is a more detailed block diagram of the wireless communication system of FIG. 1.

A more detailed embodiment of the communication system is illustrated in FIG. 2. This figure provides a schematic overview of a simple embodiment of the present invention, wherein several users (terminal units 6*a*-*c*) of the system are passengers on board a vehicle, which has one wireless router 2 communicating with one base station 7 in the surrounding area. The on-board router 2 here comprises a local proxy server and a cache 24, integrated with the router. However, the local proxy server and cache may further be connected externally to the router. A switch 25 may further be provided.

The streaming media is preferably related to video and/or audio, and is preferably provided by one or more of the protocol(s) HyperText Transfer Protocol (HTTP) and Real Time Streaming Protocol (RTSP). In particular, the streaming media may be live real-time media.

In the prevalent case of media content being available on the Internet as chunks retrievable by HTTP, the local proxy and cache 24 can be embodied by a type of software application known as a transparent proxy and web cache, in a particular arrangement. FIG. 2 shows such a simple case. The arrows indicate the flow of information in a video stream, which has arrived from the cellular base station 7 to the antenna of a modem 21 in the router on board a moving train. The router may be realized as a computer, which runs web cache software. Each user's HTTP requests for material are routed through the cache. In effect, the caching application has subscribed to the stream on behalf of the first user to request it, forming a proxy. A single copy of the stream is transported to the cache from the modem for the external wireless network. Inside the vehicle, the router has a built-in LAN switch 25 wired to a series of WLAN access points 31 in different train cars. Each viewer of a video stream is a wireless WLAN client associated with the nearest access point. All users on the vehicle who request the video stream receive its data from the cache, over these local links.

The effect of this arrangement is that only the first viewer is causing video stream traffic to be loaded onto the long-distance, low-bandwidth, potentially high-cost external link. The first viewer, and all others, receive this data over short-distance, high-bandwidth, no-cost links local to the vehicle. The users need not be aware of this service, as it operates on the level of the "chunk" inherent to the streaming protocol. Chunks may be held in volatile memory by the cache. The service here produces the benefit of scalability because it removes the danger of the external link becoming a bottleneck to competition for the stream.

With this embodiment, the external link may still be a bottleneck, but if performance is prioritized, all users can receive the highest quality version of the stream that would have been available to any one of them in the absence of competition for that particular resource. If cost or caps on a data subscription are prioritized over performance, the users may receive a lower quality, even if the available bandwidth would technically be capable of delivering more in the short term. In the latter case, an embodiment of this invention may include an algorithm for sub-stream prioritization, capable of overriding or denying even explicit user requests for better quality, and automatically finding an optimum with respect to momentarily available bandwidth on the external link or links, and their cost.

Other types of media delivery protocols, which do not use HTTP or M3U, may require markedly different software implementations, but the larger principle would be the same: a local proxy of some sort, with a cache. Embodiments may need additional software to recognize multiple requests for the same material, in case of multiple URLs (or their equivalent) existing for identical material.

In hardware, embodiments may look very different. To be able to cache streams that are not live, the cache may need access to a large, local memory bank. The router may have several external links, wired links, a built-in access point, etc. With IPv6 or future protocols similar in ambition, the modem could be an integrated part of the on-board communication router. The proxying service could be the responsibility of computers physically separate from the modem or modems, anywhere between them and the users. The caching service could then be located anywhere on the local network, where the proxy can reach it.

Figure 3:
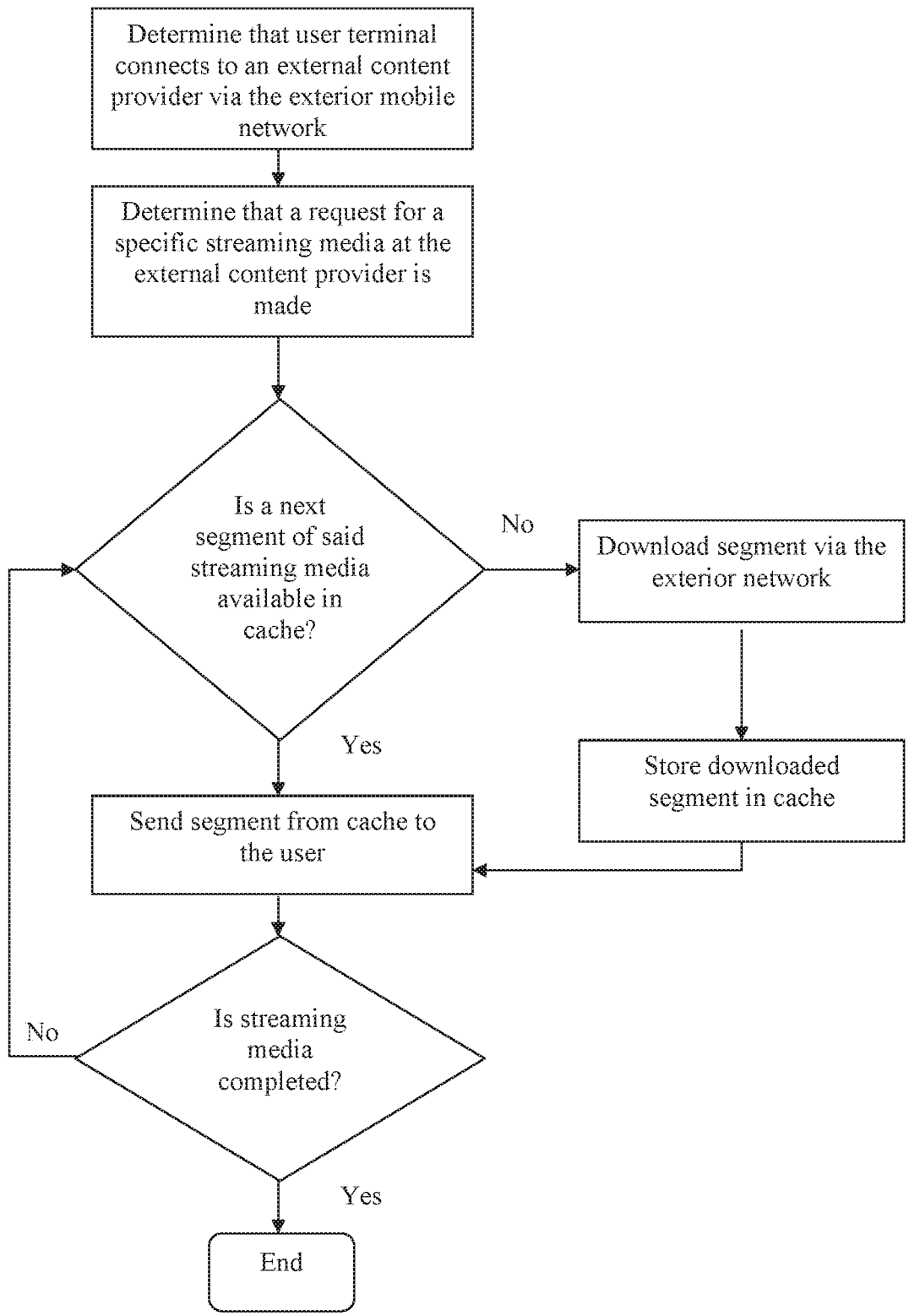
FIG. 3 is a schematic flow chart illustrating an embodiment of a method according to the present invention.

Unlike offline infotainment systems and the like, the client terminal here get access to external servers online, via the exterior mobile network. An embodiment of the method is illustrated schematically in the flowchart of FIG. 3.

In a first step the process is started by determining that a user terminal connects to an external content provider via the exterior mobile network. In a second step, it is determined that a request for a specific streaming media at the external content provider is made by the user terminal. It is then checked whether the first segment of this streaming media is available in the cache. If so, the segment is immediately provided to the user terminal from the cache, without downloading it from the external content provider. If it is not available in the cache, the segment is first downloaded to the cache via the exterior network, and is then provided to the user terminal. If the streaming media is not completed, i.e. if the streaming media comprises further segments, and the user terminal has not abandoned the streaming media, the process returns to check whether the next segment is available in the cache, and so on. As discussed in the foregoing, the method may also comprise the additional step of deciding whether each segment exists in better quality, i.e. in versions having higher encoding bitrate, and may then attempt to download such better segments to replace the segment already in the cache.

The invention has now been described with reference to specific embodiments. However, several variations of the communication system are feasible. For example, the local proxy and cache may be realized as separate units, or as one, integrated unit. Further, these units may be integrated with the router, and e.g. be realized by software within the controller of the router, or be arranged as one or several separate unit(s) connected to the router. Further, the segments of streaming media may be stored for a very limited time, or for a longer time. Further, the communication system may be used on various types of vehicles. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A method for receiving streaming media from an external provider onboard a moving vehicle via wireless communication, wherein at least one router is provided in the moving vehicle for receiving and transmitting wireless data communication to and from a stationary communication server outside said moving vehicle through an exterior mobile network, said at least one router being provided with or connected to a local proxy server and a cache onboard the vehicle, wherein said router is accessible by a plurality of client devices onboard said vehicle, comprising:
 checking, upon a request from a client device to obtain a streaming media from said external provider, whether a segment of said streaming media is available in the cache or not;
 forwarding, when a segment of said requested streaming media is available in the cache, the segment of the streaming media object to the client device from the cache;
 downloading, when said segment of the requested streaming media is not available in the cache, the segment of said streaming media object from said external server, and forwarding the downloaded segment to the client device, and storing the segment in the cache for a predetermined time, said predetermined time being in the range 0.2-120 seconds.

2. The method of claim 1, wherein the streaming media object is a live video data stream.

3. The method of claim 1, further comprising identifying the encoded bitrate of the streaming media segment, and if a version of the streaming media segment with a higher encoded bitrate is available on the external server, attempt to download the streaming media segment with a higher encoded bitrate, and, if successful, replace the original streaming media segment of lower encoded bitrate with said streaming media segment with higher encoded bitrate in the cache.

4. The method of claim 1, further comprising downloading in advance of predetermined streaming media objects to said cache prior to any request for said streaming media from any clients.

5. The method of claim 4, wherein said downloading in advance occurs at time periods when the use of the router by said clients is low, and/or when low-cost and/or high-bandwidth links to the exterior mobile network are available.

6. The method of claim 1, wherein said predetermined time is in the range 0.5-30 seconds.

7. The method of claim 1, wherein said predetermined time is in the range 1-10 seconds.

8. A wireless communication system for a moving vehicle, comprising:
 at least one router in the moving vehicle for receiving and transmitting wireless data communication to and from a stationary communication server outside said moving vehicle through an exterior mobile network, wherein said router is accessible by a plurality of client devices onboard said vehicle;
 a local proxy server and a cache onboard the vehicle, being connected to or integrated with said router;
 wherein the router is adapted to check, upon a request from a client device to obtain a streaming media from said external provider, whether a segment of said streaming media is available in the cache or not, and to forward the segment of said requested streaming media from the cache to the client when the segment is available in the cache, and to download the segment from the external server when the requested segment of the streaming media is not available in the cache, forward the downloaded segment to the client device, and store the segment in the cache for a predetermined time, said predetermined time being in the range 0.2-120 seconds.

9. The wireless communication system of claim 8, wherein the router and the communication server are connected through a plurality of exterior mobile networks, which are simultaneously useable.

10. The wireless communication system of claim 8, wherein the router is arranged to communicate with the communication server on at least two different communication routes having different characteristics, and to automatically separate the communication traffic between said communication routes based on specific optimization conditions.

* * * * *